United States Patent [19]

Held et al.

[11] Patent Number: 5,317,806
[45] Date of Patent: Jun. 7, 1994

[54] PRUNING SHEARS

[75] Inventors: Peter Held, Scheuerfeld; Helmut Weid, Niederdreisbach, both of Fed. Rep. of Germany

[73] Assignee: Wolf-Gerate GmbH Vertriebsgesellschaft KG, Fed. Rep. of Germany

[21] Appl. No.: 828,858

[22] PCT Filed: Jul. 30, 1990

[86] PCT No.: PCT/EP90/01240
§ 371 Date: Feb. 3, 1992
§ 102(e) Date: Feb. 3, 1992

[87] PCT Pub. No.: WO91/01627
PCT Pub. Date: Feb. 21, 1991

[30] Foreign Application Priority Data

Aug. 3, 1989 [DE] Fed. Rep. of Germany ....... 3925752

[51] Int. Cl.$^5$ ............................................. B26B 13/26
[52] U.S. Cl. .......................................... 30/249; 30/245
[58] Field of Search ................ 30/199, 244, 245, 246, 30/249, 250

[56] References Cited

U.S. PATENT DOCUMENTS

| 3,360,858 | 1/1968 | Cowley ................................... 30/249 |
| 3,835,535 | 9/1974 | Robison et al. ......................... 30/249 |
| 4,224,739 | 9/1980 | Emblidge ............................... 30/249 |
| 4,696,107 | 9/1987 | Held ...................................... 30/245 |

FOREIGN PATENT DOCUMENTS

| 949784 | 9/1956 | Fed. Rep. of Germany . |
| 1911737 | 3/1969 | Fed. Rep. of Germany . |
| 8224195 | 12/1982 | Fed. Rep. of Germany . |
| 3130703 | 10/1983 | Fed. Rep. of Germany . |
| 8426495 | 1/1985 | Fed. Rep. of Germany . |
| 3640390 | 11/1986 | Fed. Rep. of Germany . |
| 8802649 | 2/1988 | Fed. Rep. of Germany . |
| 1089020 | 9/1954 | France ................................... 30/249 |
| 1342882 | 10/1963 | France ................................... 30/249 |
| 582464 | 12/1976 | Switzerland . |

*Primary Examiner*—Richard K. Seidel
*Assistant Examiner*—Hwei-Siu Payer
*Attorney, Agent, or Firm*—Ostrolenk, Faber, Gerb & Soffen

[57] ABSTRACT

One arm (30) of the pruning shears is connected via a swivel joint to the end of a guide handle. The swivel joint has a hinge pin (32) the axis of which intersects the axis of the handle at a right angle and is on a line with the guide groove of a cable pulley (24) which is mounted between fork arms (20) which protrude laterally from the end of the handle. By means of a traction cable (48), the arms of the shears can be locked in any angular position of the swivel joint. A locking knob (36) presses the interlocking fork arms (26, 28) of the end of the handle or the arm (30) of the shears together, as a result of which they are fixed in position by friction.

6 Claims, 4 Drawing Sheets

PRUNING SHEARS

The present invention relates to pruning shears of the type including a moveable and a fixed arm which are spring biased apart and are moveable together. A traction cable helps move the arms together. Such pruning shears are known from German Patent U1 88 02 649. The traction cable is guided over a cable pulley on the axis. The axis of the cable pulley intersects the swivel axis at right angles. This has the result that upon the swinging of the shears around the swivel joint, the cable is lifted out of the cable pulley and jams upon pulling.

German Unexamined Application for Patent OS 36 40 390 discloses shears having a swivel joint. In this case, the swivel axis of the swivel joint is on a line with the fixed arm of the shears. In addition to the guide pulley at the free end of the handle a further guide pulley arrangement at the end of the fixed arm of the shears is required here. Nevertheless, operation without jamming is not always assured.

In the case of another pruning shears in accordance with Swiss patent 582 464 the traction cable is guided in such a manner that it intersects the swivel axis at right angles instead of being on a line with it.

In the case of another known shears in accordance with German patent U1 82 24 195, the axis of the guide pulley at the end of the handle is on a line with the axis of the swivel joint. Another guide pulley is provided in the adaptor sleeve of the fixed arm of the shears.

It is the object of the invention, proceeding from the aforementioned prior art, so to develop shears of this type that dependable guidance of the cable without the danger of jamming is assured in all conceivable positions of operation. This object is achieved by the features set forth below.

As a result of the fact that, in accordance with the first feature, the axis of the swivel joint is on a line with the axis of the guide pulley, assurance is had that upon swinging the shears into any angular position, guidance is also assured by the pulley which is not swung. By the features of the second part of the body of the claim, the result is achieved that the movement of the guide part takes place around the indicated center position with aligned axis, whereby favorable cable guidance is assured with slight pulley expense.

By the above-indicated alignment of the swivel axis, cutting can be effected via the cable in any angular position with the same expenditure of force. The angular position of the shears has no effect on the force required. Due to the fact that the shears can be set to any cutting plane, they are particularly suitable shears for green material. Due to the fact that in any angular position the mouth of the shears lies in a straight-line or offset extension of the guide handle, one can readily aim at the specific branch to be cut. The various angular positions can be set by means of detent elements, although attachment by clamping screw is preferred.

One embodiment of the invention will be described below with reference to the drawing, in which.

Figure 1:
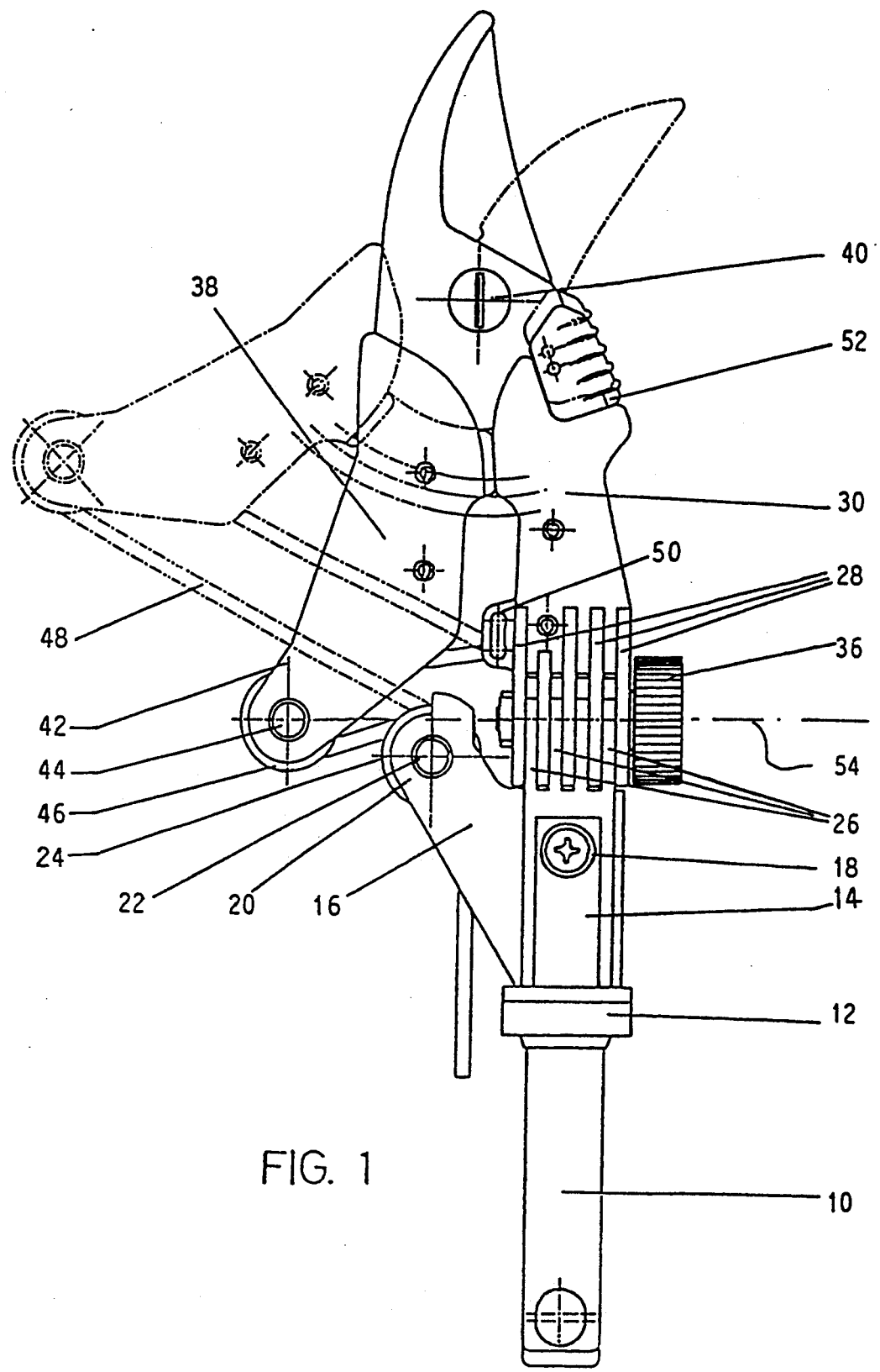
FIG. 1 is a front view of the shears of the invention.
Figure 2:
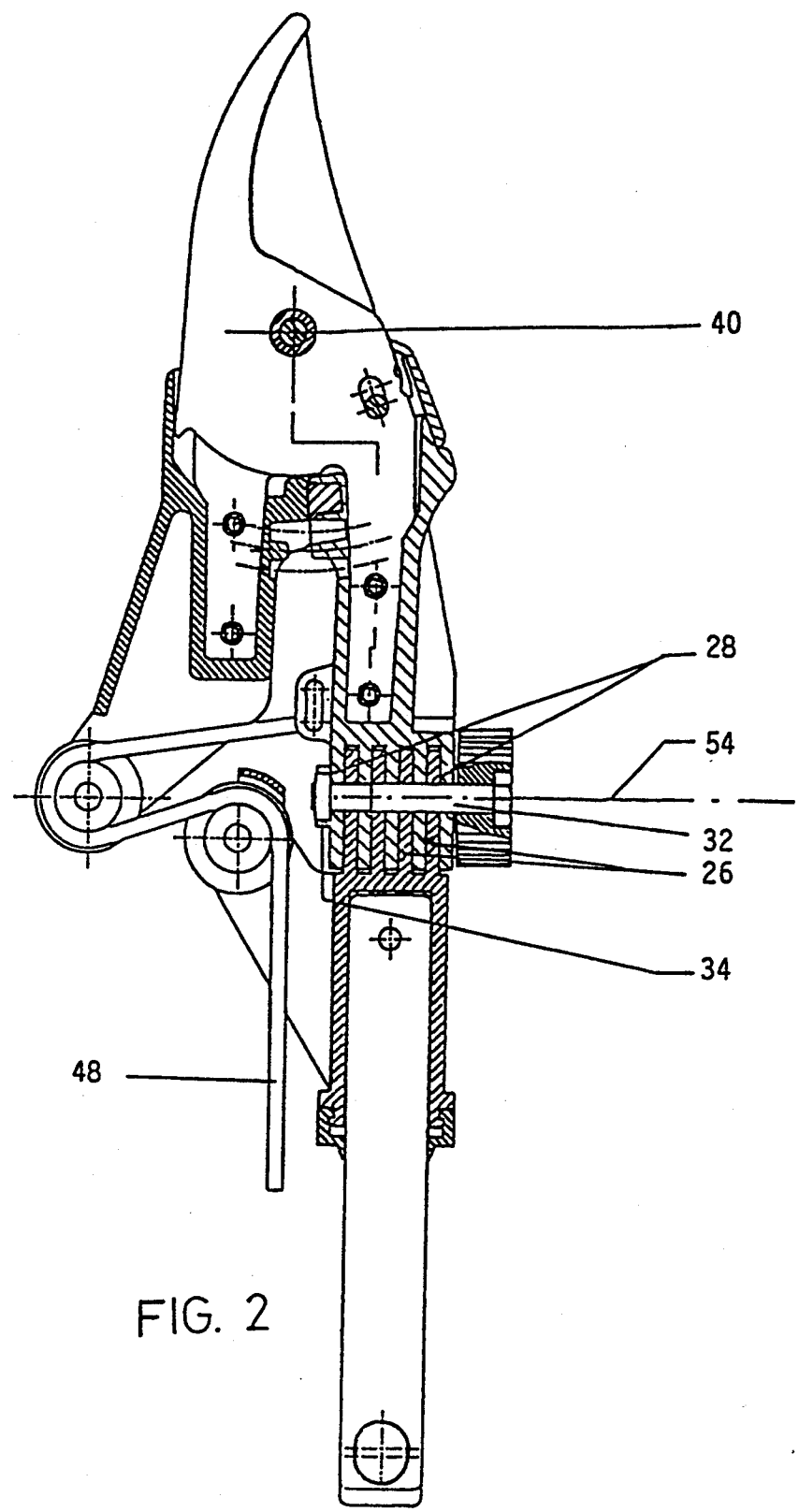
FIG. 2 is a longitudinal section through the shears of FIG. 1.
Figure 3:
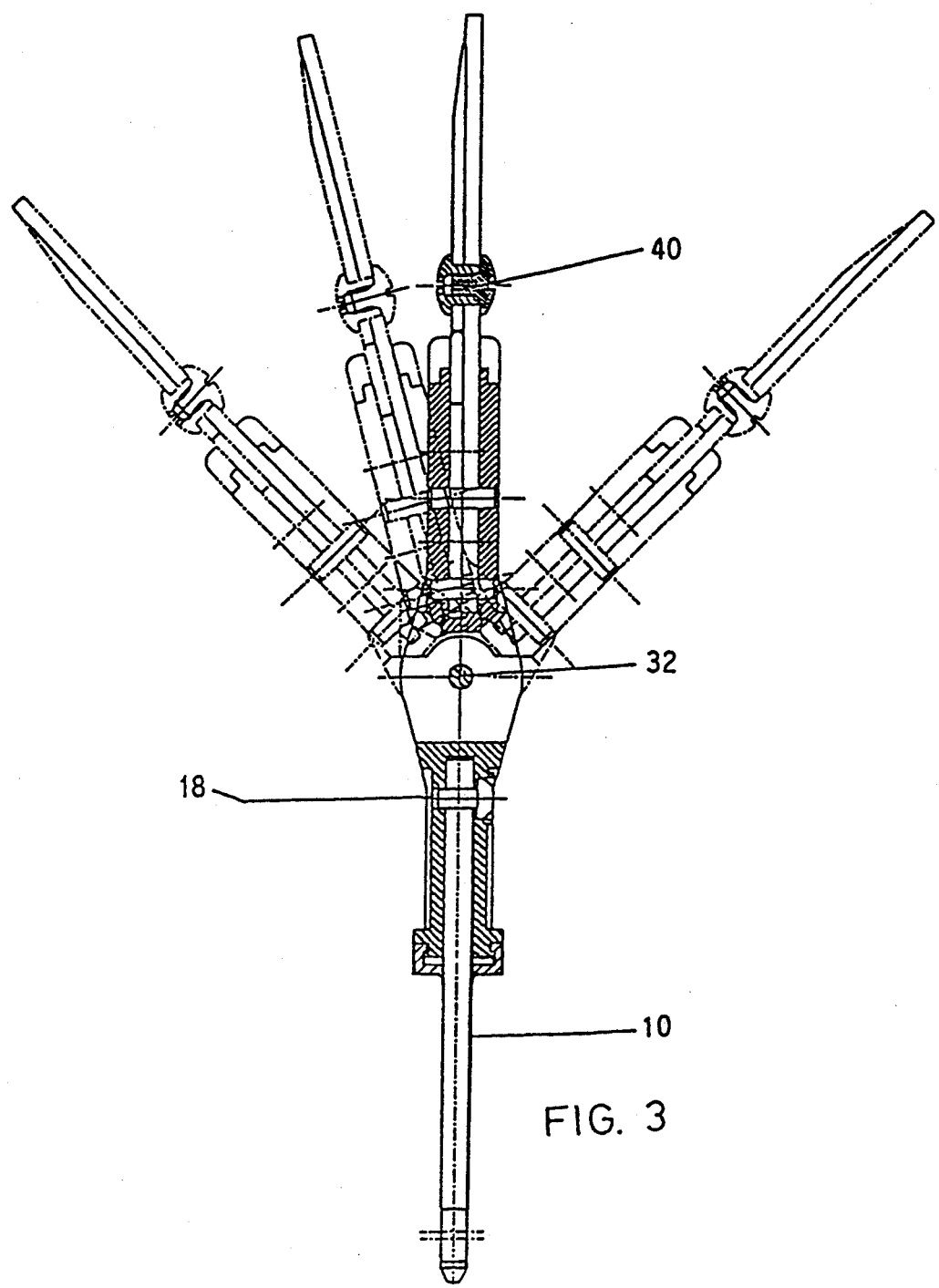
FIG. 3 is a view, partially in section, turned 90° with respect to FIGS. 1 and 2.

The pruning shears shown in FIGS. 1 to 3 has a tool-insertion shank 10 of a handle-attachment coupling which can, for instance, be developed according to German patent 31 30 703. By means of the handle-attachment coupling, the shears can be placed on a longer or shorter guide handle. It is, however, also possible to secure the shears firmly to the handle. The tool insertion shank 10 extends through a stop collar 12 having an upper extension 14 into a plastic injection-molding 16 in which the extension 14 is anchored and secured by a rivet 18. The plastic part 16 has two fork arms 20 extending laterally obliquely upward, between which a cable pulley 24 is mounted by means of a pin 22. The plastic part furthermore has upwardly protruding fork arms 26, between which fork arms 28 of the fixed arm 30 of the pruning shears engage. The fork arms 26, 28, are provided with passage holes through which there extends a swivel pin 32 the one end of which is screwed into a nut 34 anchored in the arm 30 of the shears and the other end of which bears a locking knob 36 by means of which the fork arms can be securely connected to each other by friction in any angular position. The swivel axis 54 of the swivel joint intersects the axis of the handle at a right angle and is on line with the cable groove of the cable pulley 24 in the section thereof lying above the swivel axis 22.

The moveable arm 38 of the shears is attached to the fixed arm 30 thereof by a hinge pin 40. The arm 38 of the shears, in the same way as the arm 30 thereof, consists preferably of plastic which is riveted to the metal parts of the shears, as can be noted in particular from FIG. 2.

The free end of the arm 38 of the shears has fork arms 42 which hold a pin 44 on which a cable pulley 46 is rotatably mounted. A traction cable 48 is anchored at one end in an eye 50 of the fixed arm 30 of the shears and is guided in the manner which can be noted from the drawing over cable pulleys 46 and 24. The cable extends downward over the length of the handle (not shown). An opening spring (not shown) keeps the arms of the shears spread apart and the shears can be closed by a pull on the cable, reinforced by the set of pulleys. When not in use, the shears can be kept in the closed position by a closure slide 52. As can be noted from the drawing, in every angular position the opened mouth of the shears forms a straight-line or offset extension of the axis of the handle, so that the mouth can be readily brought by the handle to the branch which is to be cut. Cutting can be effected in any angular position since proper guidance is assured by the cable pulleys in any angular position.

As can be noted from FIG. 1, the cable sections between the pulleys 24 and 46 and between the eye 50 and the cable pulley 46 extend obliquely upward in the open position and obliquely downward in the closed position. In this way, dependable guidance of the cable in the pulleys is assured and the jumping out thereof is substantially prevented.

Figure 4:
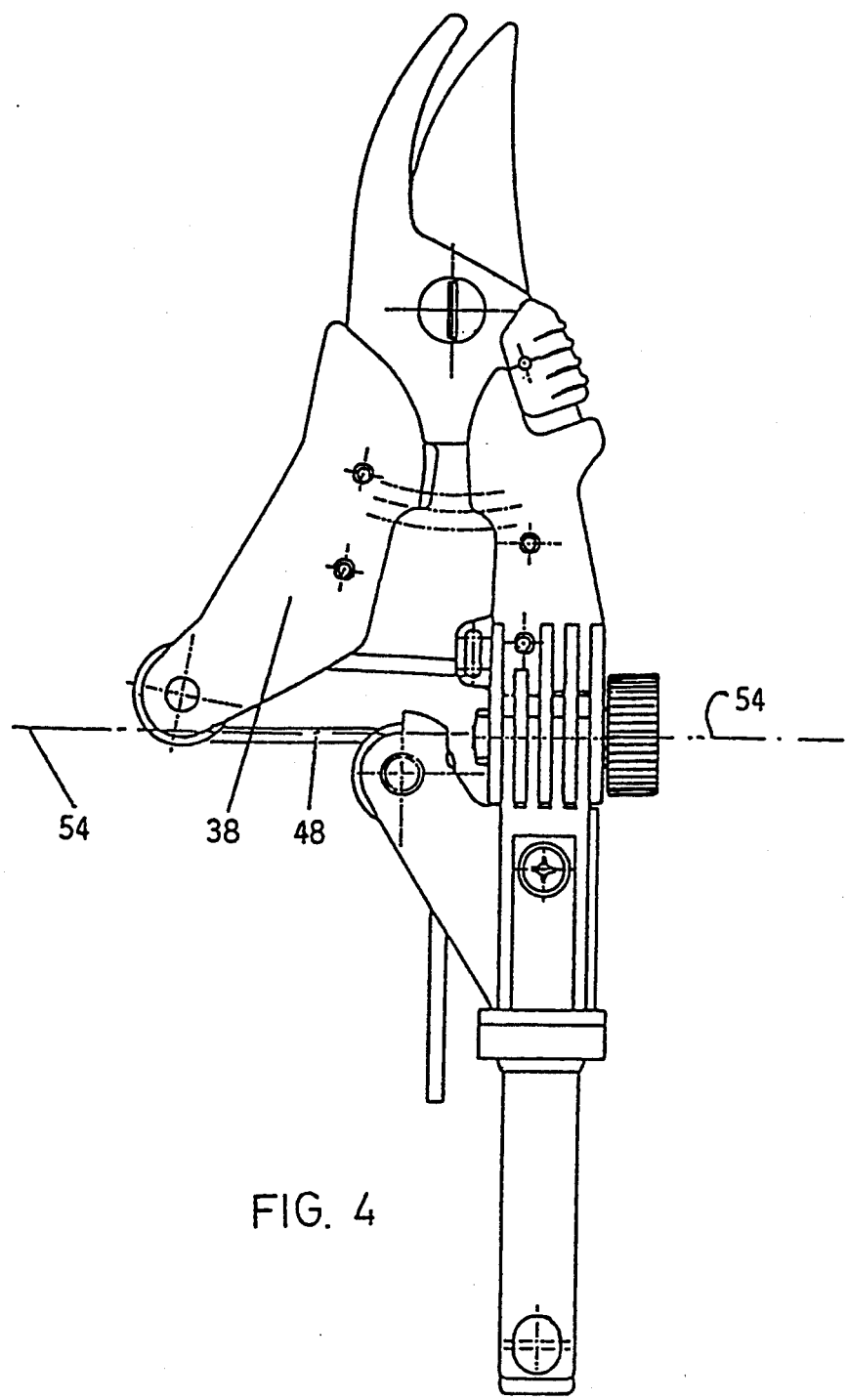
FIG. 4 is a view corresponding to FIG. 1 of the shears, partially opened.

It can be noted from FIG. 4 that, in partially opened position of the shears, the axis of rotation 54 of the swivel joint is on a line with the axis of the section of the traction cable which extends between the cable pulleys 24 and 46. In this way the result is obtained that no further guide pulleys are required since the angular deviation between the axis 54 and the cable axis is relatively small, even in the end positions shown in FIG. 1 in dash-dot line (fully open position) and in solid-line (closed position). In the closed position, the cable axis extends obliquely downward with respect to the axis of rotation 54 in the above-mentioned section between the cable pulleys and in the open position obliquely upward. Even in the most extreme oblique position of the shears, the cable pulley 24 can take over the lateral guidance of the traction cable up into the end positions.

What is claimed is:

1. Pruning shears comprising:

a fixed arm having a shearing element thereon; a shank for the fixed arm; a first swivel joint between and at right angles to both of the fixed arm and the shank for allowing swivelling of the fixed arm to adjust the angle of the fixed arm with respect to the shank, the first swivel joint having a first swivel axis;

a moveable arm also having a shearing element thereon; a second swivel joint between the fixed and the moveable arms, the second swivel joint having a second swivel axis oriented at right angles to the first swivel axis;

a first cable guide on the moveable arm, a second cable guide on the shank; a traction cable extending between the first cable guide and the second cable guide, such that pulling upon the cable at the shank moves the moveable arm with respect to the fixed arm;

the first and the second cable guides being so located that the first swivel axis is generally directed at a line with the second cable guide on the shank; the first and the second cable guides being so placed that when the fixed and moveable arms are in a central open apart position, the direction of a first section of the cable extending between the first and the second cable guides is generally aligned with the first swivel axis, when the fixed and moveable arms are in a closed together position, the direction of the first section of the cable is obliquely upward from the moveable arm and toward the second cable guide, and when the fixed and moveable arms are in a full open position, the direction of the first section of the cable is obliquely downward from the moveable arm and toward the second cable guide.

2. The pruning shears of claim 1, wherein the first cable section direction upward and direction downward are approximately at equal angles off the first swivel axis.

3. The pruning shears of claim 1, wherein the first cable guide is a first pulley on the moveable arm having a first cable guide groove therein, and the first groove guides the cable on the first pulley; the second cable guide comprises a second pulley on the shank having a second cable guide groove therein which is the part of the second guide aligned with the first swivel axis.

4. The pruning shears of claim 1, wherein the first swivel joint comprises interlocking, interleaved forked arms on the shank and on the fixed arm, respectively, and a hinge pin passed through the interleaved arms along the first swivel axis.

5. The pruning shears of claim 4, further comprising a locking knob on the hinge pin for frictionally connecting the interleaved fork arms.

6. The pruning shears of claim 1, wherein the fixed and the moveable arms include plastic injection moldings thereon.

* * * * *